Feb. 17, 1925.
S. WALDMANN
1,526,400
PROCESS OF RECOVERING METAL FROM SCRAP
Filed Aug. 30, 1921
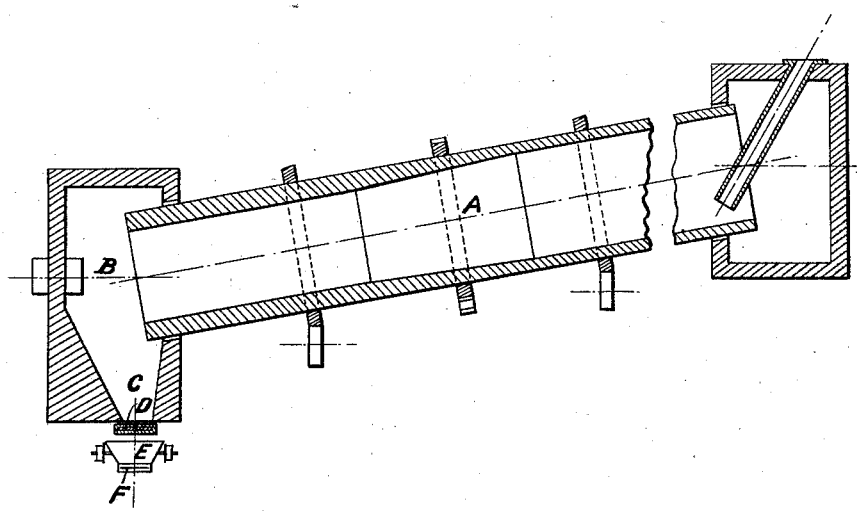
Inventor:
Sigmund Waldmann,
By Byrnes Townsend & Brickenstein
Attorneys.

Patented Feb. 17, 1925.

1,526,400

UNITED STATES PATENT OFFICE.

SIGMUND WALDMANN, OF DORTMUND, GERMANY, ASSIGNOR TO THE FIRM OF DEUTSCH-LUXEMBURGISCHE BERGWERKS- UND HÜTTEN-AKTIENGESELLSCHAFT, OF BOCHUM, GERMANY.

PROCESS OF RECOVERING METAL FROM SCRAP.

Application filed August 30, 1921. Serial No. 497,034.

*To all whom it may concern:*

Be it known that I, SIGMUND WALDMANN, a citizen of the German Republic, residing at Dortmund, Germany, have invented certain new and useful Improvements in Processes of Recovering Metal from Scrap, of which the following is a specification.

On working metals on turning-lathes and planing machines a good deal of scrap is produced consisting in curved filaments showing the tendency to interlock with each other. This scrap material can only with difficulty be recovered by a direct melting process and the greater part of such iron and steel scrap is sent through the high furnace in order to transform it into workable metal.

This invention avoids the considerable losses in metal incident to the previously known processes and provides for the direct melting down of the scrap in a very cheap and economic manner. The invention consists generally in subjecting the scrap to heating up to glowing heat, subjecting it while heated to pressure, and melting the briquettes so obtained. By subjecting the heated scrap to pressure a very strong interconnection between the several curved metal filaments is obtained owing to the fact that the heat destroys the elasticity of the filaments so that they can easily be bent together by pressure and retain their shape thus produced even after cooling so that a solid briquette is obtained the particles of which are in firm interconnection with each other. This pressure effect depends largely on the fact that the scrap has the form of metal filaments which are adapted to interlock with each other, whereas scrap which is otherwise shaped, and consists for instance of parcels of sheet metal or metal plates and rods can not be transformed by pressure in heated condition into solid briquettes because the metal particles are not firmly connected with each other unless they consist of weldable material or unless a very high pressure is applied which requires very extensive pressure devices. The heated scrap handled in accordance with this invention can be briquetted with a comparatively low pressure. For instance with a hammer of only 150 kg. of weight scrap of tempered steel of about 100 kg. tensile strength could be transformed into briquettes of 5 to 6 kg. of weight showing a specific gravity of 5 to 6. With a hammer of 500 kg. of weight briquettes up to 60 kg. of weight have been obtained showing a specific gravity of more than 7. The firmness of the briquettes is more than sufficient to resist all injury on transportation and handling.

The heating of the scrap is advantageously effected in rotary kilns. With steel scrap of high tensile strength good results are obtained by using temperatures between 750 and 1250°.

In order to avoid the oxidation of the glowing scrap while it is being transferred from the kiln to the press mould it is advisable to conduct the heating within the kiln in such way that the scrap particles are covered with a layer or envelop of reducing gas clinging thereto.

This envelope of reducing gas for the swarf may be provided by moving the swarf in a reducing fire through the revolving furnace in a direction opposite to that of the furnace gases. In this treatment there occurs with the increasing heat, first of all, a reduction of the oxygen compound adhering to the swarf and the oxygen compounds of the metal, causing with a further rise in temperature an adhesion of the reducing gas to the surface of the swarf or the like which gas layer on removal of the swarf from the furnace acts as a protective layer preventing oxidation of the metal.

In order more thoroughly to protect the metal, it is advisable to transfer the highly heated swarf or the like which is enveloped by the reducing gas, not directly in a continuous stream from the revolving furnace to the press mould or to a conveying receptacle, but to allow the same to accumulate in a heap in a stationary closed furnace head, and to remove the same portion by portion from the heap in the furnace head. This removal of portion by portion from the heap in the furnace head is of special importance, as by this means the contact with the oxygen of the air is restricted to the outside layers of the portion of swarf removed each time from the head of the furnace.

If this procedure is followed such quantities of reducing gas will be transferred with the swarf portions to the press mould that the swarf briquettes after being pressed, exhibit for some little time signs of combustion on their surface, which are evidently due to the gradual escaping of the highly compressed reducing gas from the briquettes.

A rotary furnace of the type having a stationary furnace head at the outlet end, suitable for carrying the invention into effect, is shown by way of example in the accompanying drawing, more or less diagrammatically.

In the drawing A is the revolving tube of the furnace, and B is the stationary furnace head arranged in front of the outlet end of the revolving furnace. In the bottom wall of the furnace head B there is provided an outlet opening C for the swarf or the like. The outlet opening C is provided with a sliding shutter D. In the drawing there is shown beneath the outlet opening C a heat insulated transport trolley E provided with a shutter F, by means of which the discharge of the swarf from the trolley may be regulated. By means of this trolley E the swarf taken from the furnace is conveyed to the compressor, where it is placed in the press mould for converting it into swarf briquettes.

The briquettes obtained in the manner described can be introduced into and melted down within a so-called Martin kiln without any material loss in metal.

Although the process is intended before all to be used for recovering steel scrap, yet it can be employed also in connection with scrap of other metals provided that such scrap is in the form of filaments such as are produced by working the metals on turning-lathes and planing machines. This is an essential feature because only scrap particles of this kind are adapted to interlock with each other so that a firm connection between the different particles can be obtained by compressing the scrap mass when heated to a point where the metal loses its elasticity so that after the pressing operation no tendency resulting from elastic forces is present within the scrap particles to return into their initial shape before pressure application.

The binding together of scrap particles by interlocking makes it possible to bind together with the metal scrap also other material such as carbon so that briquettes are obtained which do not consist exclusively of metal scrap but also of other additional material such as carbon either in the form of coal or of coke. Iron and steel briquettes containing a suitable portion of carbon can be used in the manufacture of steel in the so-called Martin kilns; such briquettes containing free carbon may also be used in connection with the so-called Thomas process in order to introduce a small quantity of carbon into the metal bath when the blowing process has been too much extended.

Also other substances different from carbon may be introduced into the scrap briquettes during the briquetting operation.

Briquettes of the above mentioned high density with contents in carbon may be obtained in the following manner: Iron and steel scrap in the form of filaments such as produced by working metal on turning-lathes and planing machines are intermixed with granular coke and introduced into a rotary kiln which is heated with reducing flame. This mixture of metal scrap and coke is caused to pass through the kiln, whereby the mixture is made very intimate and a reduction of oxygen combinations is obtained as is desirable especially if highly rusted scrap is used.

In addition to coal or coke other substances may be intermixed with the metal scrap during the rotary kiln treatment. In this way certain reactions can be caused to take place within the rotary kiln which it is intended to perform by such additions and which otherwise would take place only within the Martin or some other kiln wherein the metal is melted.

What I claim is:—

1. Process of recovering metal from scrap resulting from working metals on turning-lathes or planing machines consisting in heating the scrap up to glowing heat, subjecting it while heated to pressure and melting the briquettes so obtained.

2. Process of recovering metal from scrap resulting from working metals on turning-lathes or planing machines consisting in heating the scrap up to a temperature, where it has lost its elasticity, subjecting it while heated to pressure and melting the briquettes so obtained.

3. Process of recovering metal from scrap resulting from working metals on turning-lathes or planing machines consisting in heating the scrap up to glowing heat, subjecting it while heated to pressure and adding the briquettes so formed to the charge of melting furnaces.

4. Process of recovering metal from scrap resulting from working blocks of nonwelding metal on turning-lathes or planing machines consisting in heating the scrap up to glowing heat, subjecting it while heated without welding additions to pressure and melting the briquettes so obtained.

5. Process of recovering metal from scrap resulting from working metals on turning-lathes or planing machines consisting in heating the scrap up to glowing heat, subjecting it while heated to pressure with addition of refining substances and melting the briquettes so obtained.

6. Process of recovering metal from iron or steel scrap resulting from working blocks of metal on turning-lathes or planing machines, consisting in heating the scrap up to glowing heat, subjecting it while heated to pressure with addition of carbon and adding the briquettes so obtained to steel charges of melting furnaces.

7. Process of recovering metal from iron or steel scrap resulting from working blocks of metal on turning-lathes or planing machines, consisting in heating the scrap with admixture of carbon up to glowing heat in a reducing heating atmosphere, subjecting the heated mixture to pressure and adding the briquettes so obtained to steel charges of melting furnaces.

8. In a process of recovering metal from scrap by hot briquetting the scrap and melting the briquettes the steps which consist in heating the scrap in a revolving furnace in reducing furnace gases, the scrap moving in a direction contrary to that of the furnace gases, and briquetting the scrap while associated with the reducing furnace gases.

9. In a process of recovering metal from scrap by hot briquetting the scrap and melting the briquettes the steps which consist in heating the scrap in a revolving furnace in reducing furnace gases, the scrap moving in a direction contrary to that of the furnace gases, collecting the heated scrap in a closed stationary furnace head, removing the scrap from said furnace head in portions, and briquetting the scrap while associated with said reducing gases.

In testimony whereof I affix my signature in presence of two witnesses.

SIGMUND WALDMANN.

Witnesses:
OTTO SCHNEIDER,
WILHELM SCHUTZ.